Figure 1:
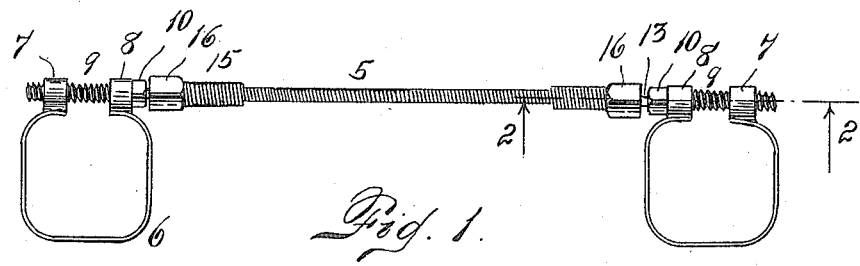

J. E. CANNING.
TOOTH REGULATING APPLIANCE.
APPLICATION FILED MAR. 14, 1916.

1,202,798.

Patented Oct. 31, 1916.

Witnesses
Otto E. Hoddick.
John B. Dade.

Inventor
John E. Canning.
By A. J. O'Brien
Attorney

UNITED STATES PATENT OFFICE.

JOHN E. CANNING, OF DENVER, COLORADO.

TOOTH-REGULATING APPLIANCE.

1,202,798.  Specification of Letters Patent.  Patented Oct. 31, 1916.

Application filed March 14, 1916. Serial No. 84,056.

*To all whom it may concern:*

Be it known that I, JOHN E. CANNING, a citizen of the United States, residing in the city and county of Denver and State of Colorado have invented certain new and useful Improvements in Tooth-Regulating Appliances; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for regulating the position of the human teeth in order to bring any teeth which are abnormally arranged or located, back into their normal position with reference to the other teeth.

My improvement includes the use of a bolt which passes through the sleeves of the anchor band, being threaded into one sleeve and loose in the other, its forward extremity being equipped with a small head upon which are formed a few left-hand screw threads adapted to coöperate with approximately a corresponding number of interior screw threads formed in the head of a sleeve which is provided with a cavity beyond its left-hand screw threaded portion, adapted to receive the head of the bolt, thus leaving room for the head of the latter, whereby the sleeve may be turned in either direction for the purpose of adjusting the arch, without disconnecting the sleeve and bolt or interfering in any way with the predetermined adjustment of the bolt which passes through the sleeves of the anchor band as aforesaid. Forward of the cavity adapted to receive the left-hand screw threaded end of the bolt, the sleeve is provided with right-hand threads adapted to receive corresponding threads formed on the arch. By virtue of this construction the sleeve may be turned to either shorten or lengthen the arch, without disconnecting it from the bolt which passes through the sleeves of the anchor band, since, when the sleeve is turned toward the right, its head will first be moved into engagement with a stop with which the bolt is provided in the rear of its forward extremity carrying the left-hand screw threads, and, consequently, this left-hand screw threaded extremity of the bolt will in that event remain within the cavity in the head of the sleeve, thus preventing its left-hand threads from engaging the corresponding left-hand threads at the rear extremity of the sleeve. Consequently, the arch will be adjusted without disconnecting the sleeve and bolt. Again, if the sleeve is turned toward the left or in direction to shorten or tighten the arch, while the left-hand screw threads of the sleeve will be brought into engagement with the correspondingly threaded portion of the bolt, the sleeve and bolt will not be disconnected, since the rotation is in the wrong direction for unscrewing the left-hand threaded parts.

As shown in the drawing, the arch is composed of a spiral spring while the sleeve beyond the head in which the cavity is formed, consists of a spiral spring whose convolutions are wound to form interior screw threads which coöperate with the exterior threads of the spiral spring arch. It must be understood, however, that this arch may if desired, be a solid wire arch, while the sleeve may consist of a rigid member having interior screw threads to receive the exterior threads of the solid wire arch, the head of the sleeve being constructed with the cavity and left-hand screw threads at its rear extremity adjacent the cavity, as heretofore described.

Having briefly outlined my improved construction, I will proceed to describe the same in detail, reference being made to the accompanying drawing, in which is illustrated an embodiment thereof.

Figure 2:
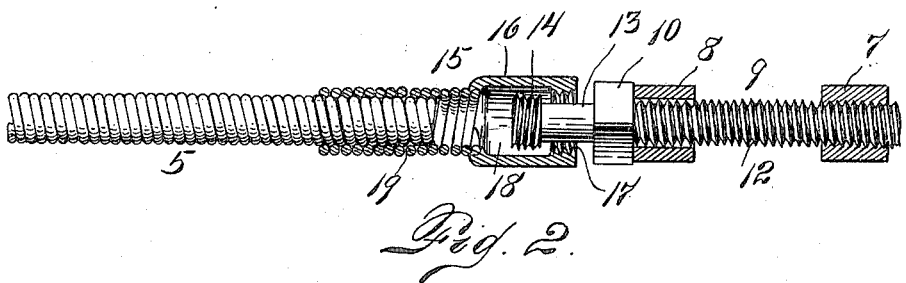
Figure 3:
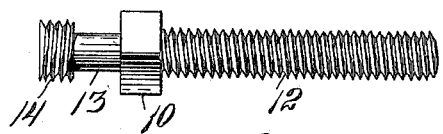
Figure 4:
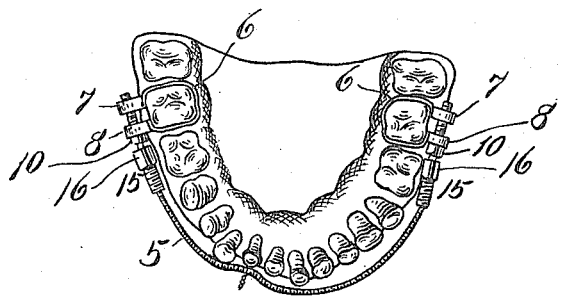

In this drawing, Figure 1 is an elevation of a tooth regulating arch and two anchor bands connected with the arch through the medium of my improvement. Fig. 2 is a fragmentary view of the same partly in section and shown on a larger scale. Fig. 3 is a detail view of the bolt shown on the same scale as in Fig. 2. Fig. 4 is a view showing a tooth regulator applied to a set of human teeth, the arch being connected from the bolts of the anchor bands in accordance with my improvement. In this view the construction is shown on a much smaller scale than in Fig. 1.

The same reference characters indicate the same parts in all the views.

Let the numeral 5 designate a tooth regulating arch; and 6 each of two anchor bands which are provided with sleeves 7 and 8, the sleeve 7 being threaded to coöperate with the interior threads of a bolt 9, while the sleeve 8 is plain or unthreaded and arranged to slide freely on the threaded portion of the bolt. This bolt is equipped with an enlarged part 10 polygonal in cross section to facilitate the manipulation of the bolt or member 9 by means of a wrench or some suitable grasping device. The bolt 9 has a right-hand threaded portion 12 in the rear of the part 10, a plain or unthreaded portion or neck 13 forward of the part 10, and a short portion 14 equipped with left-hand screw threads, at its forward extremity. The terms front and rear or similar or equivalent expressions in this specification, are employed with reference to the location of the parts as shown in Fig. 4, it being assumed that the anchor bands 6 are applied to two of the large teeth in the rear of the mouth. Consequently, the parts of the arch and its attachments are designated by the terms front and rear with special reference to this arrangement, and this specification as well as the claims must be interpreted in the light of this explanation.

Arranged adjacent each of the bolts or members 9, is a sleeve 15 which has an enlarged head 16 whose rear extremity is open and provided with a number of interior left-hand screw threads 17 arranged to coöperate with the left-hand threaded extremity 14 of the bolt 9. Forward of the screw threads 17 of the head 16, this head is provided with an interior cavity 18 which is considerably larger than the extremity 14 of the bolt 9, whereby the sleeve 15 may be freely turned without disconnecting the sleeve and bolt as long as the left-hand screw threaded extremity 14 of the bolt 9 remains within this cavity. The portion 19 of the sleeve 15, as shown in the drawing, is composed of a spiral spring whose convolutions are so arranged as to form an interior right-hand screw thread which coöperates with the exterior thread formed on the arch 5 which, as shown in the drawing, is also formed of a spiral spring. It is evident, however, as heretofore indicated, that the part 19 of the sleeve 15 may be formed integral with the head 16, or may be of ordinary interiorly threaded formation, the interior threads coöperating with the exterior threads of the arch 5. The head 16 of the sleeve 15 is exteriorly polygonal in cross section to facilitate its manipulation by the use of a wrench or other suitable device.

From the foregoing description the use and operation of my improved tooth regulating appliance will be readily understood.

Assuming that the device is applied to the teeth as illustrated in Fig. 4, if it is desired to loosen or lengthen the arch, the sleeve 15 is turned toward the right, in which event the rear extremity of the head 16 of the sleeve will in the first instance move into contact with the enlarged part 10 of the bolt 9, after which during this adjustment or the rotation of the sleeve 15 toward the right, the left-hand screw threads 17 of the sleeve will be kept out of contact with the left-hand screw threaded extremity 14 of the bolt 9. Consequently, the sleeve will not become detached from the bolt. In this case, as the sleeve 15 is turned, the adjacent extremity of the arch 5 will travel out of the sleeve the required distance. Again, if it is desired to shorten the arch or increase its tension, the sleeve 15 will be turned toward the left. In this case, the threaded part 17 of the sleeve will in the first instance travel into engagement with the threaded part 14 of the bolt, but, as the sleeve is being rotated toward the left, the threaded parts 17 and 14 will not coöperate and the sleeve cannot become detached from the bolt. When it is desired to detach the sleeve 15 from the bolt 9, the head 15 is moved to cause its threads 17 to engage the threads 14 of the bolt, after which the sleeve is rotated toward the right, causing the aforesaid left-hand threaded parts, to engage, whereby the two parts 9 and 15 may be disconnected.

Attention is called to the fact that when the sleeve 15 is turned toward the right for the purpose of lengthening the arch, the resistance resulting from the connection of one or more of the teeth (see Fig. 4) with the arch by means of a ligature or ligatures, will force the sleeve 15 rearwardly in the first instance until its rear extremity engages the enlarged part or abutment 10 of the bolt, thus insuring that the threaded part 14 of the bolt will not come in contact with the threads 17 of the sleeve, and therefore, preventing the disconnection of the sleeve and bolt.

Having thus described my invention, what I claim is,—

1. A device of the class described, including an anchor band, bolt and a coöperating sleeve having interior right-hand screw threads at one extremity, left-hand screw threads at its opposite extremity and an interposed cavity, the bolt having exterior left-hand screw threads at one extremity adapted to coöperate with the left-hand threads at one extremity of the sleeve, the bolt also having a reduced neck in the rear of its said threaded extremity, and an abutment in the rear of the said neck, the said cavity of the sleeve being large enough to accommodate the left-hand threaded end of the bolt to permit independent rotation of the sleeve or bolt.

2. A device of the class described, including an anchor band bolt, an arch and a coöperating sleeve, the bolt having exterior screw threads at one extremity, and the sleeve having interior coöperating threads at the adjacent extremity and an enlarged cavity adapted to receive the threaded end of the bolt after passing through said interiorly threaded end of the sleeve.

3. A sleeve threaded at one extremity to coöperate with an anchor bolt and at its opposite extremity to coöperate with an arch, and having an unthreaded cavity located between its two threaded portions.

In testimony whereof I affix my signature, in presence of two witnesses.

JOHN E. CANNING.

Witnesses:
GRACE HUSTON,
A. EBERT O'BRIEN.

Copies of this patent may be obtained for five cents each, by addressing the "Commissioner of Patents, Washington, D. C."